US012325384B2

(12) United States Patent
Bojjanapalli et al.

(10) Patent No.: US 12,325,384 B2
(45) Date of Patent: Jun. 10, 2025

(54) NEXT GENERATION WINDSHIELD WASH SYSTEM

(71) Applicant: Rosemount Aerospace Inc., Burnsville, MN (US)

(72) Inventors: Muralidhar Rao Bojjanapalli, Hyderabad (IN); Sandeep Jayaraj, Bangalore (IN)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 18/494,553

(22) Filed: Oct. 25, 2023

(65) Prior Publication Data

US 2025/0018899 A1  Jan. 16, 2025

(30) Foreign Application Priority Data

Jul. 11, 2023  (IN) .............................. 202311046559

(51) Int. Cl.
*B60S 1/48* (2006.01)
*B60S 1/50* (2006.01)
*B60S 1/52* (2006.01)
*B64C 1/14* (2006.01)
*B64F 5/30* (2017.01)

(52) U.S. Cl.
CPC ................. *B60S 1/481* (2013.01); *B60S 1/50* (2013.01); *B60S 1/522* (2013.01); *B64C 1/14* (2013.01); *B64F 5/30* (2017.01)

(58) Field of Classification Search
CPC .. B60S 1/481; B60S 1/50; B60S 1/522; B64F 5/30; B64C 1/14
See application file for complete search history.

(56) References Cited

U.S. PATENT DOCUMENTS

| 4,768,716 A * | 9/1988 | Buchanan, Jr ............ B05B 9/06 |
| | | 239/284.1 |
| 6,281,649 B1 | 8/2001 | Ouellette et al. |
| 6,892,417 B2 | 5/2005 | Franco et al. |
| 9,290,158 B2 | 3/2016 | Dominique et al. |
| 2003/0042328 A1 | 3/2003 | Wojan et al. |
| 2015/0183404 A1 | 7/2015 | Romack et al. |
| 2016/0207504 A1 | 7/2016 | Sasaki et al. |
| 2024/0217485 A1* | 7/2024 | Thebault ................. B60S 1/481 |
| 2024/0294145 A1* | 9/2024 | Grasso ................... B60S 1/481 |

FOREIGN PATENT DOCUMENTS

| DE | 102020119473 A1 | 1/2022 |
| FR | 3097826 A1 | 1/2021 |
| JP | 2000190822 A | 7/2000 |

OTHER PUBLICATIONS

Extended European Search Report dated Nov. 18, 2024, for corresponding European Patent Application No. 24188121.8, 8 pgs.

* cited by examiner

*Primary Examiner* — Sharidan Carrillo
(74) *Attorney, Agent, or Firm* — Kinney & Lange, P.A.

(57) ABSTRACT

A windshield wash system includes a pump with an inlet and an outlet, and a fluid reservoir fluidically connected to the inlet of the pump. A fluid delivery line is fluidically connected to the outlet of the pump and at least one nozzle is fluidically connected to the fluid delivery line. An electronic control unit is in controlling communication with the pump. A pressure sensor is in the fluid delivery line and is in communication with the electronic control unit.

9 Claims, 1 Drawing Sheet

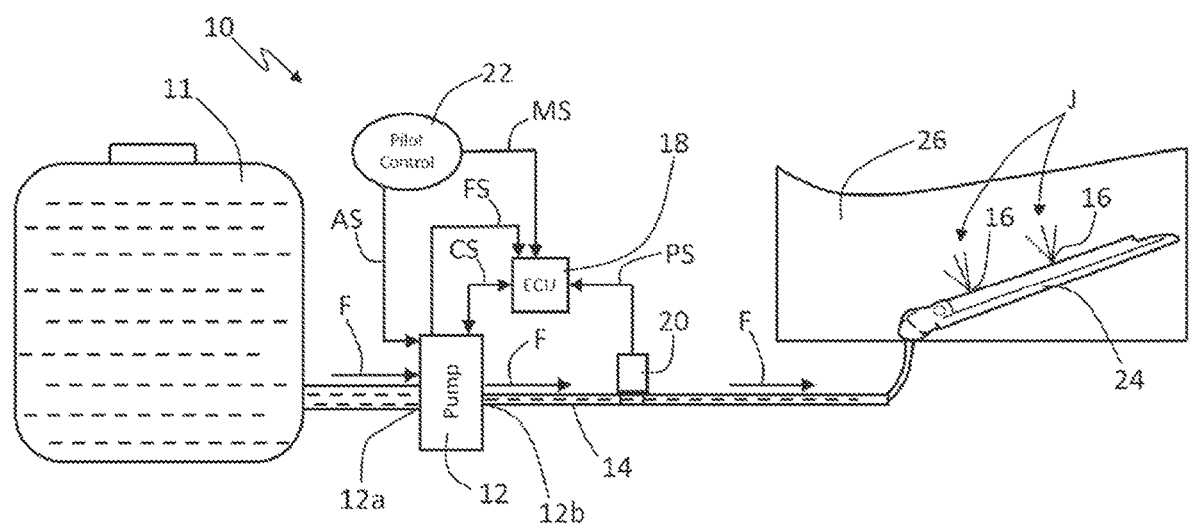

NEXT GENERATION WINDSHIELD WASH SYSTEM

BACKGROUND

The present disclosure relates to systems for washing windshields, and in particular, to systems for washing windshields on aircraft.

Windshield wiper and wash systems are used in helicopters and other aircraft to clean the windshield and provide a clear view through the windshield for the pilots. The windshield wash system is essential for keeping the windshield sufficiently clean for pilot visibility. The windshield wash system assists the wiper system in cleaning of windshield in no-rain conditions, whenever required. The main purpose of the windshield wiper and wash system is to remove dirt, fluid, and snow from the windshield.

Typical windshield wash systems include a pump to supply fluid from a fluid reservoir to nozzles that spray jets of the fluid onto a windshield. After the fluid is sprayed onto the windshield, the wiper system actuates a wiper arm to wipe and remove the fluid from the windshield along with any dirt or debris on the windshield. Speed, altitude, and maneuvering of the aircraft can cause a typical windshield wash system to perform inconsistently. Inconsistent performance of the windshield wash system can lead to clogging of hydraulic lines over time.

SUMMARY

A windshield wash system includes a pump with an inlet and an outlet, and a fluid reservoir fluidically connected to the inlet of the pump. A fluid delivery line is fluidically connected to the outlet of the pump and at least one nozzle is fluidically connected to the fluid delivery line. An electronic control unit is in controlling communication with the pump. A pressure sensor is in the fluid delivery line and is in communication with the electronic control unit.

A method for washing a windshield on an aircraft includes activating, by a pilot control, a pump to flow a fluid from a reservoir, through the pump, into a fluid delivery line, and through at least one nozzle aimed at a windshield of an aircraft. A pressure sensor in the fluid delivery line senses a pressure of the fluid flowing in the fluid delivery line. The pressure sensor sends a pressure signal representative of the pressure of the fluid flowing in the fluid delivery line to an electronic control unit. The electronic control unit, in a first mode, sends a pressure command signal to the pump to adjust a speed of the pump to match the pressure of the fluid flowing in the fluid delivery line to a desired pressure.

A method for washing a windshield on an aircraft includes activating, by a pilot control, a metering pump to flow a fluid from a reservoir, through the metering pump, into a fluid delivery line, and through at least one nozzle aimed at a windshield of an aircraft. A flow rate signal is sent from the metering pump to an electronic control unit representative of a flow rate of the fluid flowing into the fluid delivery line. The electronic control unit, in a first mode, sends a flow rate command signal to the metering pump to adjust a speed of the metering pump to match the flow rate of the fluid flowing in the fluid delivery line to a desired flow rate of the fluid.

The present summary is provided only by way of example, and not limitation. Other aspects of the present disclosure will be appreciated in view of the entirety of the present disclosure, including the entire text, claims and accompanying figures.

BRIEF DESCRIPTION OF THE DRAWINGS

FIG. 1 is a schematic diagram of a windshield wash system for an aircraft.

While the above-identified drawing FIGURE sets forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The FIGURES may not be drawn to scale, and applications and embodiments of the present invention may include features and components not specifically shown in the drawings. Like reference numerals identify similar structural elements.

DETAILED DESCRIPTION

This disclosure relates to a windshield wash system with a closed loop pressure and flow control to ensure that the windshield wash system maintains delivery of the fluid at a desired pressure and/or desired flow rate in any given conditions of speed and altitude of flight. The windshield wash system includes a pressure sensor in a fluid delivery line that receives the fluid from a pump. The pressure sensor communicates a pressure signal to an electronic control unit (ECU), and the ECU controls a speed of the pump to adjust the flow of the fluid in the fluid delivery line to maintain the desired pressure and/or flow rate of the fluid. The windshield wash system is discussed below with reference to FIG. 1.

FIG. 1 is a schematic diagram of windshield wash system 10. As shown in FIG. 1, windshield wash system 10 includes, fluid reservoir 11, pump 12 with inlet 12a and outlet 12b, fluid delivery line 14, nozzles 16, electronic control unit (ECU) 18, pressure sensor 20, and pilot control 22. FIG. 1 also shows wiper arm 24, windshield 26 of an aircraft (not shown), fluid F, jets J, activation signal AS, flow rate signal FS, mode signal MS, pressure signal PS, and command signal CS.

Fluid reservoir 11 is a refillable tank carried on the aircraft that supplies fluid F to windshield wash system 10. Fluid F can be water, a liquid soap or detergent, an anti-icing liquid, or any other useful liquid treatment for application to windshield 26. Fluid reservoir 11 is fluidically connected to inlet 12a of pump 12. In the example of FIG. 1, pump 12 is an electrically powered metering pump. Pump 12 can be physically mounted to fluid reservoir 11 such that inlet 12a receives fluid F directly from fluid reservoir 11. In other examples, such as the example of FIG. 1, inlet 12a of pump 12 can be connected to fluid reservoir 11 by a hose or fluid line.

Outlet 12b of pump 12 is fluidically connected to fluid delivery line 14. Fluid delivery line 14 is a hose or fluid line that connects outlet 12b of pump 12 to nozzles 16. Nozzles 16 are aimed at windshield 26 to spray jets J of fluid F at windshield 26. In the example of FIG. 1, nozzles 16 are mounted to wiper arm 24 and move with wiper arm 24 on windshield 26. Mounting nozzles 16 onto wiper arm 24 reduces the distance between jets J and wiper arm 24, thereby reducing the likelihood that fluid will be blown away before contacting windshield 26 during flight of the aircraft. In other examples, nozzles 16 can be mounted to the aircraft near windshield 26.

ECU 18 is in controlling communication with pump 12. ECU 18 is a computer with a processor, system memory, and embedded software capable of processing information signals from pilot control 22, pressure sensor 20, and pump 12, and capable of sending command signals CS to pump 12. ECU 18 can be hardwired to pump 12, pressure sensor 20, and pilot control 22, or ECU 18 can communicate wirelessly with pump 12, pressure sensor 20, and pilot control 22. Pressure sensor 20 is in fluid delivery line 24 and is in communication with ECU 18. Pressure sensor 20 is a pressure transducer that senses a pressure of fluid F in fluid delivery line 24 and generates pressure signal PS representative of the pressure of fluid F in fluid delivery line 24. Pressure sensor 20 communicates pressure signal PS to ECU 18. Pump 12 generates flow rate signal FS representative of a flow rate of fluid F flowing out of pump 12 and through fluid delivery line 24. Pump 12 communicates flow rate signal FS to ECU 18. ECU 18 can generate command signals CS and send command signals CS to pump 12 to alter and control a speed of pump 12. Pilot control 22 is a controller and/or switch in the cabin of the aircraft that provides a pilot interface for windshield wash system 10. Pilot control 22 is in communication with pump 12 and ECU 18. Pilot control 22 can be hardwired to pump 12 and ECU 18 or pilot control 22 can communicate wirelessly with pump 12 and ECU 18. Pilot control 22 is configured to send activation signal AS to pump 12 to turn pump 12 on. Pilot control 22 is also configured to send mode signal(s) MS to ECU 18 to switch ECU 18 between a pressure mode and a flow rate mode.

To operate windshield system 10, a pilot of the aircraft will first manipulate pilot control 22 to send activation signal AS to pump 12 to turn on and activate pump 12. As pump 12 actuates, pump 12 moves fluid F from fluid reservoir 11 into fluid deliver line 14, past pressure sensor 20, and sprayed through nozzles 16 as jets J onto windshield 26. Pilot control 22 can also send activation signal AS to an actuator of wiper arm 24 such that wiper arm 24 moves on windshield 26 to wipe away fluid F and clean windshield 26. As pump 12 moves fluid F from fluid reservoir 11 into fluid delivery line 14, pump 12 sends flow rate signal FS to ECU 18. As fluid F flows past pressure sensor 20, pressure sensor 20 sends pressure signal PS to ECU 18.

When a pilot on the aircraft switches ECU 18 to pressure mode using pilot control 22, ECU 18 will read pressure signal PS and compare pressure signal PS to a desired target pressure for the flow of fluid F in fluid delivery line 14. The desired target pressure is the pressure at which the flow of fluid F in fluid delivery line 14 will provide a sufficient stream of fluid F to nozzles 16. When in pressure mode, ECU 18 uses pressure signal PS as feedback from pressure sensor 20 and controls the speed of pump 12 to match the real pressure in fluid delivery line 14 to the desired target pressure. If the pressure of fluid F in fluid delivery line 14 is lower than the desired target pressure, ECU 18 sends a pressure command signal CS to pump 12 that increases the speed of pump 12 to increase the pressure in fluid delivery line 14 to match the desired target pressure. If the pressure of fluid F in delivery line 14 is higher than the desired target pressure, ECU 18 sends pressure command signal CS to pump 12 that decreases the speed of pump 12 to reduce the pressure in fluid delivery line 14 to match the desired target pressure. Matching the pressure of fluid F in fluid delivery line 14 ensures that nozzles 16 are continuously receiving a constant supply of fluid F regardless of the outside pressure surrounding the aircraft.

When the pilot on the aircraft switches ECU 18 to flow rate mode using pilot control 22, ECU 18 will read flow rate signal FS from pump 12 and compare the real flow rate of fluid F exiting pump 12 and entering fluid delivery line 14 to a desired target flow rate for fluid F. The desired target flow rate for fluid F is the flow rate at which the flow of fluid F in fluid delivery line 14 will provide a sufficient stream of fluid F to nozzles 16. The desired flow rate for fluid F can vary depending on altitude and speed of the aircraft, and on a temperature of fluid F. If flow rate signal FS indicates that the real flow rate of fluid F entering fluid delivery line 14 is lower than the desired target flow rate, ECU 18 will send flow rate command signal CS to pump 12 to increase the real flow rate of fluid F in fluid delivery line 14 to match the desired target flow rate. If flow rate signal FS indicates that the real flow rate of fluid F entering fluid delivery line 14 is higher than the desired target flow rate, ECU 18 will send flow rate command signal CS to pump 12 to decrease the real flow rate of fluid F in fluid delivery 14 to match the desired target flow rate.

When in flow rate mode, ECU 18 takes the flow rate feedback from pump 12 and delivers the flow of fluid F to match the desired target flowrate along with required pressure. When flowing fluid F at a given pressure and temperature passes into a lower pressure environment in fluid delivery line 14, the velocity and flow rate of fluid F increases. Similarly, when flowing fluid F at a given pressure and temperature passes into a higher-pressure environment in fluid delivery line 14, the velocity of fluid F decreases. This means that the flow rate of fluid F in fluid delivery line 14 can change as the aircraft changes speed, altitude, and temperature without making any changes to the speed of pump 12. So, when flow rate mode is selected by the pilot, the pressure differential is always maintained in the flow of fluid F by maintaining the flow rate of fluid F constant. This compensates for the pressure changes in environment arising out of altitude and/or speed of flight. For a given pressure differential, flow rate of fluid F is unique. Thus, ECU 18 can set the flow rate of fluid F for a required differential pressure. Thus, ECU 18 in flow rate mode automatically takes care of ambient pressure changes in fluid delivery line 14.

During flight of the aircraft, the pilot can use pilot control 22 to selectively switch ECU 18 between the flow rate mode and the pressure mode as needed for effective cleaning of windshield 26. Since ECU 18 can control the speed of pump 12, ECU 18 can adjust the speed of pump 12 to keep the flow of fluid F through nozzles 16 steady and compensate for pressure changes arising out of altitude and/or flight speed changes. Maintaining the pressurized flow through fluid delivery line 14 and nozzles 16 helps keep windshield wash system 10 clean and helps prevent progressive clogging of windshield wash system 10. Even and consistent spraying of nozzles 16 also extends the operational life of wiper arm 24 by reducing friction and wear between wiper arm 24 and windshield 26. Windshield wash system 10 can be easily implemented into existing fluid reservoirs with minimal modification and cost.

Discussion of Possible Embodiments

The following are non-exclusive descriptions of possible embodiments of the present invention.

In one example, a windshield wash system includes a pump with an inlet and an outlet, and a fluid reservoir fluidically connected to the inlet of the pump. A fluid delivery line is fluidically connected to the outlet of the pump and at least one nozzle is fluidically connected to the fluid delivery line. An electronic control unit is in controlling communication with the pump. A pressure sensor is in the fluid delivery line and is in communication with the electronic control unit.

The windshield wash system of the preceding paragraph can optionally include, additionally and/or alternatively, any one or more of the following features, configurations and/or additional components:
- a pilot control switch in communication with the electronic control unit;
- a pressure mode wherein the electronic control unit receives a pressure signal from the pressure sensor representative of a pressure of a fluid flowing through the fluid delivery line and the electronic control unit sends a pressure command signal to the pump to adjust a speed of the pump to match the pressure of the fluid to a desired pressure;
- the electronic control unit comprises: a flow rate mode wherein the electronic control unit receives a flow rate signal from the pump representative of a flow rate of the fluid flowing out of the pump and the electronic control unit sends a flow rate command signal to the pump to adjust the speed of the pump to match the flow rate of the fluid to a desired flow rate of the fluid;
- the pilot control switch is configured to switch the electronic control unit from the pressure mode to the flow rate mode and vice versa;
- the pump is a metering pump; and/or
- the at least one nozzle is mounted to a windshield wiper on an aircraft.

In another example, a method for washing a windshield on an aircraft includes activating, by a pilot control, a pump to flow a fluid from a reservoir, through the pump, into a fluid delivery line, and through at least one nozzle aimed at a windshield of an aircraft. A pressure sensor in the fluid delivery line senses a pressure of the fluid flowing in the fluid delivery line. The pressure sensor sends a pressure signal representative of the pressure of the fluid flowing in the fluid delivery line to an electronic control unit. The electronic control unit, in a first mode, sends a pressure command signal to the pump to adjust a speed of the pump to match the pressure of the fluid flowing in the fluid delivery line to a desired pressure.

The method of the preceding paragraph can optionally include, additionally and/or alternatively, any one or more of the following features, configurations and/or additional components:
- sending, by the electronic control unit in the first mode, the pressure command signal to the pump to increase the speed of the pump when the pressure of the fluid flowing in the fluid delivery line is below the desired pressure;
- sending, by the electronic control unit in the first mode, the pressure command signal to the pump to decrease the speed of the pump when the pressure of the fluid flowing in the fluid delivery line is above the desired pressure;
- sending a flow rate signal from the pump to the electronic control unit representative of a flow rate of the fluid flowing into the fluid delivery line; and sending, by the electronic control unit in a second mode, a flow rate command signal to the pump to adjust the speed of the pump to match the flow rate of the fluid flowing in the fluid delivery line to a desired flow rate of the fluid;
- switching the electronic control unit from the first mode to the second mode by the pilot control; and/or
- switching the electronic control unit from the second mode to the first mode by the pilot control.

In another example, a method for washing a windshield on an aircraft includes activating, by a pilot control, a metering pump to flow a fluid from a reservoir, through the metering pump, into a fluid delivery line, and through at least one nozzle aimed at a windshield of an aircraft. A flow rate signal is sent from the metering pump to an electronic control unit representative of a flow rate of the fluid flowing into the fluid delivery line. The electronic control unit, in a first mode, sends a flow rate command signal to the metering pump to adjust a speed of the metering pump to match the flow rate of the fluid flowing in the fluid delivery line to a desired flow rate of the fluid.

The method of the preceding paragraph can optionally include, additionally and/or alternatively, any one or more of the following features, configurations and/or additional components:
- sensing a pressure of the fluid flowing in the fluid delivery line by a pressure sensor in the fluid delivery line; sending, by the pressure sensor, a pressure signal representative of the pressure of the fluid flowing in the fluid delivery line to the electronic control unit; and sending, by the electronic control unit in a second mode, a pressure command signal to the metering pump to adjust the speed of the metering pump to match the pressure of the fluid flowing in the fluid delivery line to a desired pressure;
- switching the electronic control unit from the first mode to the second mode by the pilot control; and/or
- switching the electronic control unit from the second mode to the first mode by the pilot control.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for washing a windshield on an aircraft comprises:
    activating, by a pilot control, a pump to flow a fluid from a reservoir, through the pump, into a fluid delivery line, and through at least one nozzle aimed at a windshield of an aircraft;
    washing the windshield of the aircraft by spraying at least one jet of the fluid from the at least one nozzle to the windshield;
    sensing a pressure of the fluid flowing in the fluid delivery line by a pressure sensor in the fluid delivery line;
    sending, by the pressure sensor, a pressure signal representative of the pressure of the fluid flowing in the fluid delivery line to an electronic control unit; and
    sending, by the electronic control unit in a first mode, a pressure command signal to the pump to adjust a speed of the pump to match the pressure of the fluid flowing in the fluid delivery line to a desired pressure.

2. The method of claim 1, further comprising:
    sending, by the electronic control unit in the first mode, the pressure command signal to the pump to increase the speed of the pump when the pressure of the fluid flowing in the fluid delivery line is below the desired pressure.

3. The method of claim 1, further comprising:
    sending, by the electronic control unit in the first mode, the pressure command signal to the pump to decrease the speed of the pump when the pressure of the fluid flowing in the fluid delivery line is above the desired pressure.

4. The method of claim 1, further comprising:

sending a flow rate signal from the pump to the electronic control unit representative of a flow rate of the fluid flowing into the fluid delivery line; and sending, by the electronic control unit in a second mode, a flow rate command signal to the pump to adjust the speed of the pump to match the flow rate of the fluid flowing in the fluid delivery line to a desired flow rate of the fluid.

5. The method of claim 4, further comprising:

switching the electronic control unit from the first mode to the second mode by the pilot control.

6. The method of claim 5, further comprising:

switching the electronic control unit from the second mode to the first mode by the pilot control.

7. A method for washing a windshield on an aircraft comprises:

activating, by a pilot control, a metering pump to flow a fluid from a reservoir, through the metering pump, into a fluid delivery line, and through at least one nozzle aimed at a windshield of an aircraft;

washing the windshield of the aircraft by spraying at least one jet of the fluid from the at least one nozzle to the windshield;

sending a flow rate signal from the metering pump to an electronic control unit representative of a flow rate of the fluid flowing into the fluid delivery line;

sending, by the electronic control unit in a first mode, a flow rate command signal to the metering pump to adjust a speed of the metering pump to match the flow rate of the fluid flowing in the fluid delivery line to a desired flow rate of the fluid;

sensing a pressure of the fluid flowing in the fluid delivery line by a pressure sensor in the fluid delivery line;

sending, by the pressure sensor, a pressure signal representative of the pressure of the fluid flowing in the fluid delivery line to the electronic control unit; and sending, by the electronic control unit in a second mode, a pressure command signal to the metering pump to adjust the speed of the metering pump to match the pressure of the fluid flowing in the fluid delivery line to a desired pressure.

8. The method of claim 7, further comprising:

switching the electronic control unit from the first mode to the second mode by the pilot control.

9. The method of claim 7, further comprising:

switching the electronic control unit from the second mode to the first mode by the pilot control.

\* \* \* \* \*